US010309416B2

(12) United States Patent
Montemayor et al.

(10) Patent No.: US 10,309,416 B2
(45) Date of Patent: Jun. 4, 2019

(54) SEAL SYSTEM FOR CENTRIFUGAL PUMPS HAVING AXIALLY SPLIT CASINGS

(71) Applicant: RUHRPUMPEN SA de CV, Garcia, Nuevo Leon (MX)

(72) Inventors: Armando Mesta Montemayor, Garcia Nuevo Leon (MX); Adrian Guadalupe Vallejo Torres, Nuevo Leon (MX)

(73) Assignee: RUHRPUMPEN SA DE CV (MX)

( * ) Notice: Subject to any disclaimer, the term of this patent is extended or adjusted under 35 U.S.C. 154(b) by 647 days.

(21) Appl. No.: 14/647,650

(22) PCT Filed: Nov. 29, 2012

(86) PCT No.: PCT/IB2012/002811
§ 371 (c)(1),
(2) Date: May 27, 2015

(87) PCT Pub. No.: WO2014/083374
PCT Pub. Date: Jun. 5, 2014

(65) Prior Publication Data
US 2015/0300365 A1 Oct. 22, 2015

(51) Int. Cl.
F04D 29/42 (2006.01)
F16J 15/06 (2006.01)
F04D 1/00 (2006.01)
F04D 29/08 (2006.01)

(52) U.S. Cl.
CPC ............ *F04D 29/42* (2013.01); *F04D 1/006* (2013.01); *F04D 29/086* (2013.01); *F04D 29/426* (2013.01); *F16J 15/062* (2013.01)

(58) Field of Classification Search
None
See application file for complete search history.

(56) References Cited

U.S. PATENT DOCUMENTS

| | | | |
|---|---|---|---|
| 1,456,051 A | 5/1923 | Carter | |
| 2,287,397 A * | 6/1942 | Rupp | F04D 1/006 415/214.1 |
| 2,815,549 A | 12/1957 | Olson | |
| 3,121,570 A | 2/1964 | Gilbert | |
| 3,160,107 A * | 12/1964 | Ross | F04D 29/426 277/358 |
| 3,375,789 A | 4/1968 | Easton | |
| 4,113,407 A | 9/1978 | Grzina | |
| 4,550,921 A * | 11/1985 | Smith | F16L 23/20 277/614 |
| 4,575,306 A | 3/1986 | Monnot | |
| 5,029,878 A | 7/1991 | Ray | |
| 5,076,591 A | 12/1991 | Gentile | |

(Continued)

FOREIGN PATENT DOCUMENTS

| | | | |
|---|---|---|---|
| CN | 101816311 A | * | 8/2010 |
| GB | 177491 | * | 2/1922 |
| JP | 2008082418 A | | 4/2008 |

Primary Examiner — Justin D Seabe
Assistant Examiner — Juan G Flores
(74) Attorney, Agent, or Firm — McAfee & Taft

(57) ABSTRACT

Disclosed invention is an improved sealing system for axially split, centrifugal pumps. The improved sealing system eliminates the need for a gasket between casing halves. In the improved sealing system, a fluid tight seal is provided by an elastomeric cord positioned within a groove carried by the flange of at least one half of the axially split pump casing.

46 Claims, 10 Drawing Sheets

(56) References Cited

U.S. PATENT DOCUMENTS

| | | | |
|---|---|---|---|
| 5,253,875 A | 10/1993 | Gentile | |
| 5,492,336 A * | 2/1996 | Barna | B29C 55/005 |
| | | | 277/314 |
| 6,193,240 B1 | 2/2001 | Johnson et al. | |
| 7,225,533 B2 | 6/2007 | Sylvia et al. | |
| 2009/0110579 A1 | 4/2009 | Amburgey | |
| 2009/0223661 A1 | 9/2009 | Khazanovich et al. | |

* cited by examiner

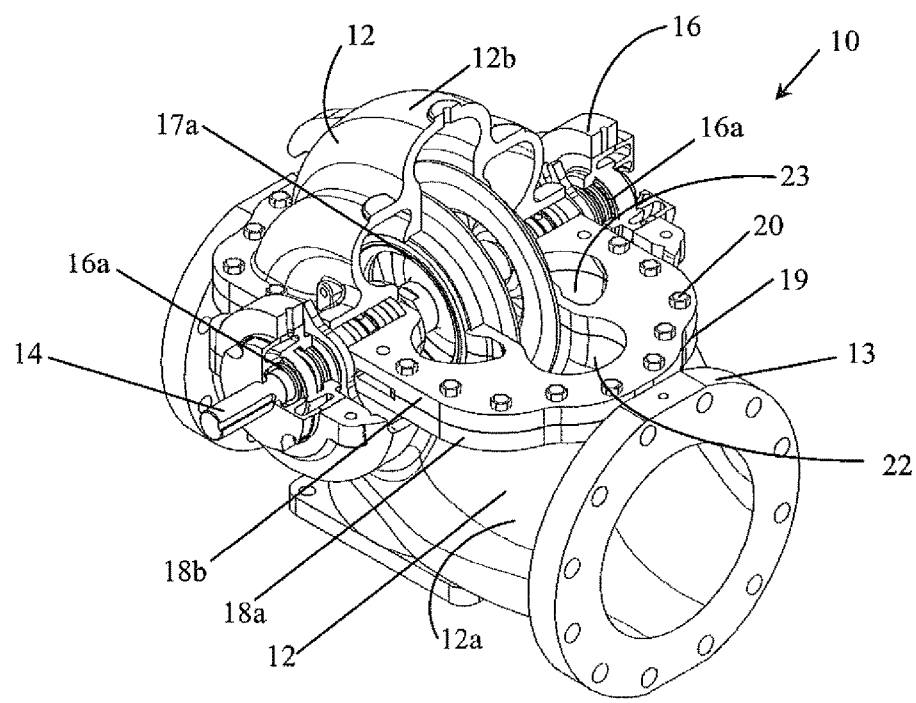
Figure 1 – Prior Art
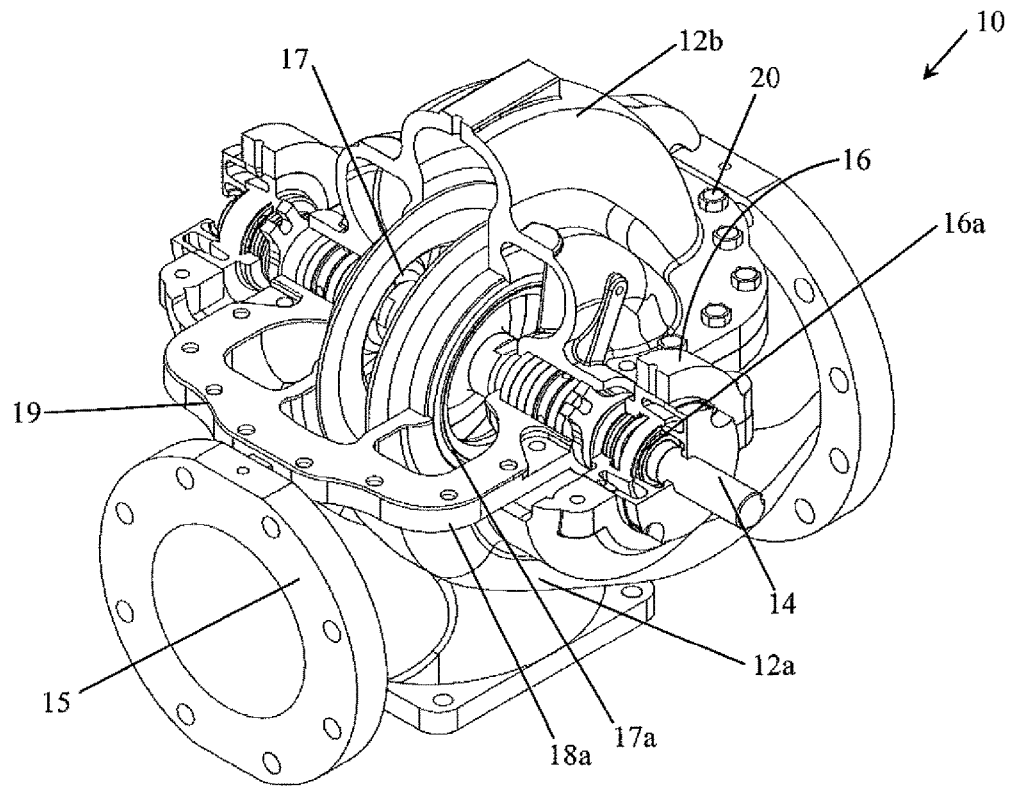
Figure 2 – Prior Art

SEAL SYSTEM FOR CENTRIFUGAL PUMPS HAVING AXIALLY SPLIT CASINGS

BACKGROUND

Centrifugal pumps having axially split, also known as horizontally split, casings are well known in the industry. In fact, such pumps have been manufactured for at least 100 years.

Axially split pumps may have single or double volute casings. FIG. 1 depicts a conventional double volute centrifugal pump 10 having an axially split casing 12. The axial split in casing 12 permits easy separation and service of the internal components. Thus, the pump casing 12 has a lower half 12a and an upper half 12b. Standard components of centrifugal pump 10 include a shaft 14, bearing housing 16, bearing 16a and an impeller 17. Shaft 14 is driven by a prime mover (not shown). Bearings 16a rest in conventional bearing seats, not shown. Impeller 17 also has impeller wear surfaces 17a which rest in impeller seats, not shown. The other conventional components, such as suction and discharge nozzles, identified as 13 and 15 respectively, and other characteristics of centrifugal pump 10 are well known to those skilled in the art and will not be further discussed.

Design changes have been rare in the field of centrifugal pumps having axially split casings. Currently available pumps have relatively long life spans when serviced regularly. However, improvements which reduce the cost of manufacturing and improve serviceability of the conventional pump remain desirable. Conventional pump design utilizes gasket material 19 between the flanges 18a and 18b of the lower and upper casing halves 12a and 12b. As known to those skilled in the art, gasket material 19 is cut to match the machined surfaces of flanges 18a, 18b. When clamped between flanges 18a, 18b, gasket material 19 provides sealing capabilities to compensate for variations in the machined surface of the joined components. To provide the necessary seal at the desired operational pressures, conventional pumps 10 utilize flanges having thicknesses of about 2 inches to about 6 inches. However, even with the robust flange thickness, the bolted joint permits pump operational pressures of only about 150 psi to about 300 psi.

The manufacturing process of currently available centrifugal pumps is constrained by the requirement to use a gasket to effect a seal between lower and upper casing halves 12a, 12b. Current manufacturing processes must consider the thickness of gasket material 19 with regard to machining of lower and upper casing halves 12a, 12b. As a result, gasket material 19 becomes part of the assembly tolerances between casing halves 12a, 12b. Thus, the inter-relationship of gasket material 19, and casing halves 12a, 12b precludes subsequent substitution of casing halves. As a result, casing halves 12a, 12b for each pump are mated for life, i.e. one cannot use a substitute casing half to repair the pump without re-machining of each casing half.

Use of gasket material 19 also complicates subsequent service of centrifugal pump 10. Gasket material 19 must be replaced each time upper casing half 12b is removed from pump 10. Prior to reassembly, mating surfaces must be cleaned of all old gasket material and a replacement gasket installed. Thus, prior to servicing pump 10, the operator must have gasket material available for reassembly.

The present invention provides an improved seal system between flanges 118a and 118b. The improved seal system eliminates the need for a gasket positioned between the flanges and permits reduction in flange thickness. Further, the present invention permits interchangeability of casing halves. As a result, the improved seal system reduces manufacturing costs and enhances serviceability of the centrifugal pump.

SUMMARY

In one embodiment, the present invention provides an axially split, centrifugal pump comprising a lower casing, carrying a flange having a mating surface and an upper casing, carrying a flange having a mating surface. When the upper and lower casings are secured to one another the mating surfaces are in direct contact.

In another embodiment, the present invention provides an axially split, centrifugal pump comprising a lower casing and an upper casing with each casing carrying a flange having a mating surface. The lower casing flange carries first and second grooves. The first groove isolates a high pressure zone from a low pressure zone and the second groove isolates the low pressure zone from the external environment. First and second elastomeric cords positioned within the first groove and second grooves have vertical heights greater than the depth of the groove. The pump further includes a side cover having a mating surface with at least a portion of the mating surface in contact with the upper casing and at least a portion of the mating surface in contact with the lower casing. The mating surface of the side cover further carries a groove with an elastomeric cord positioned in the groove. The elastomeric cord positioned within the side cover groove has a vertical height greater than the depth of the groove. When assembled and prior to operation, the mating surfaces of the upper and lower casings are in direct contact with one another.

Still further, the present invention provides a method of manufacturing axially split centrifugal pumps. The method of the present invention comprises forming a lower casing having a flange. The lower casing flange has a mating surface carrying at least one groove. Additionally, the method forms an upper casing having a flange with a mating surface. According to this method, an elastomeric cord is positioned within at least one groove on the mating surface of the lower casing flange. The upper and lower casing halves are assembled to one another such that each mating surface directly contacts the opposing mating surface. Following assembly, side cover mating surfaces are machined into the upper and lower casing halves.

BRIEF DESCRIPTION OF THE DRAWINGS

FIG. 1 is a perspective view of a prior art centrifugal pump with an axially split casing shown with a partial cut-away of the upper casing.

FIG. 2 is a perspective view of a prior art centrifugal pump with an axially split casing shown with a partial cut-away of the upper casing with the gasket on the flange of the lower casing visible.

FIGS. 8A and 8B depict side views of the casing cover wherein FIG. 8A is a top view and FIG. 8B is a sideview.

DETAILED DESCRIPTION

Figure 3:
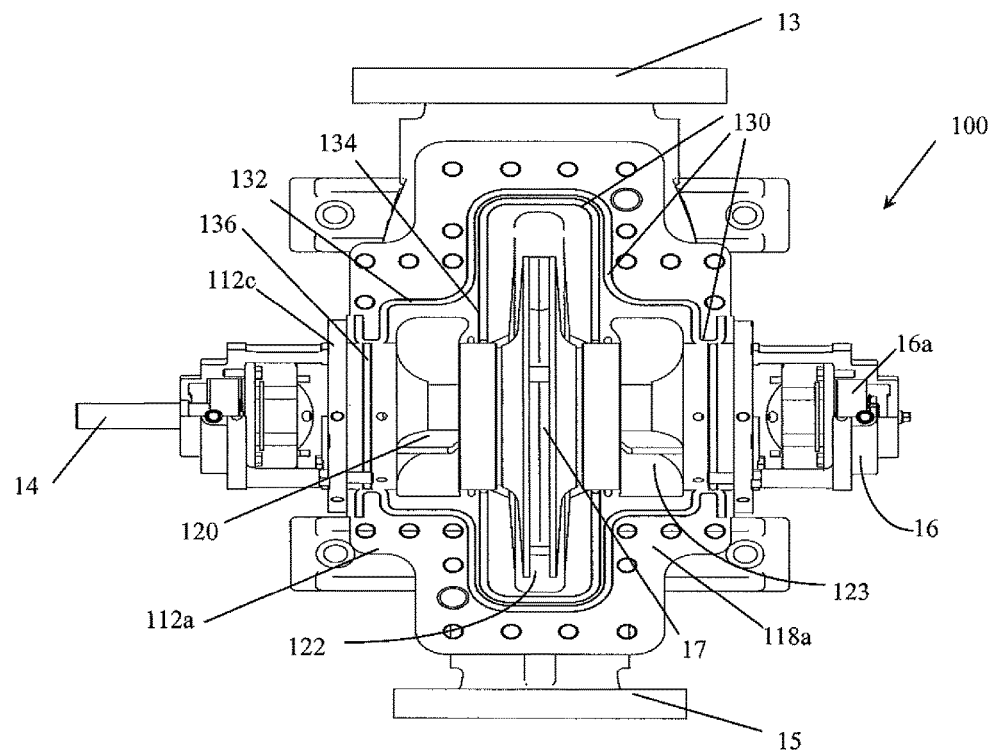
FIG. 3 depicts the improved seal system of the current invention installed on the lower casing of an improved centrifugal pump having an axially split casing.

As known to those skilled in the art, pressure is defined as a force acting over an area. Pressure applied to fluid acts in all directions equally and will move through the path of least resistance. During operation of split casing centrifugal pump 10, rotation of impeller 17 imparts velocity to the liquid within the vanes of impeller 17. Casing 12 and discharge nozzle 15 restrict flow of the liquid thereby generating pressure within pump 10. A common measure of the mechanical energy imparted to fluid by a centrifugal pump is known as "head." The head generated by a given pump at a given speed and capacity will remain constant for all fluids barring any viscosity effects. Head is commonly expressed in feet or meters of liquid.

The ability to mechanically seal lower and upper casing halves 12a, 12b and to preclude leakage from high pressure area 22 to lower pressure area 23 is a significant limitation on the ability of currently available centrifugal pumps to generate increased head. The limitations on head also limit the pumping capacity of a centrifugal pump. Accordingly, improvements in the mechanical seal between casing halves will allow pump operators to increase pumping capacity. As depicted in FIGS. 1 and 2, prior art pumps provide a seal by relying upon a gasket 19 sandwiched between heavy, thick flanges 18a, 18b and a plurality of one inch to three inch bolts with associated nuts, identified as bolts/nuts 20 in FIG. 1. When torqued to values appropriate for bolt size/metallurgy and flange thickness, bolts/nuts 20 secure gasket material 19 between flanges 18a, 18b of lower and upper casing halves 12a, 12b thereby providing a mechanical seal.

In terms of pump operational pressures, prior art pumps using a gasket are capable of operating at pressures up to about 300 psi. In contrast, the new sealing system permits a pump having the same configuration to operate at pressures up to 700 psi.

As known to those skilled in the art, in the prior art pumps, any flaws in the machined mating surfaces of flanges 18a, 18b contacting gasket material 19 provide a potential fluid path for water leakage, i.e. pressure loss. Thus, use of the prior art gasket required precision machining of mating surfaces. Further, the use of a gasket necessitated a machining process wherein lower and upper casing halves were assembled with a gasket in place. Following assembly, the manufacturer would machine the circular openings for the impeller seats (not shown in FIG. 1 or 2). Since the machining of the surfaces for the impeller seats included the presence of the gasket to be used during final assembly, casing halves 12a and 12b were necessarily mated for the life of the pump. As a result, neither casing half could be replaced with an alternative casing half.

In contrast, in the present invention, elimination of gasket material 19 allows for direct contact of upper and lower casing halves 12a, 12b. Thus, machining of impeller seats 143 does not require accounting for the sealing component. As a result, the sealing system of the present invention provides centrifugal pumps 100 wherein lower and upper casing halves 112a, 112b are interchangeable with other pumps of the same size. The configuration and elements of the improved sealing system are discussed in detail below. Elements common to centrifugal pumps, such as impeller 17, bearing housings 16 and bearings 16a, will not be discussed further. Rather, the following discussion focuses on the improved sealing system and the resulting improved centrifugal pump 100.

Figure 4:
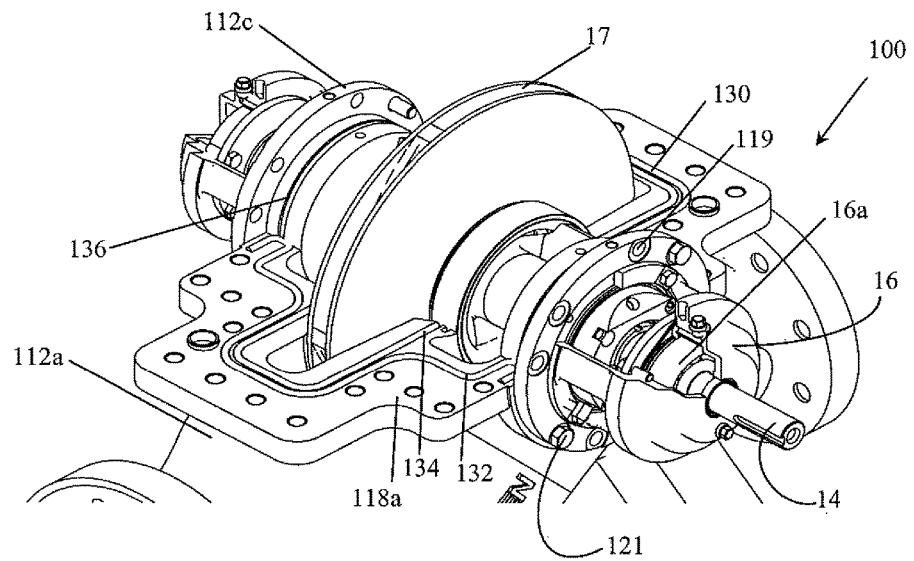
FIG. 4 is a perspective view of an improved centrifugal pump having an axially split casing with the upper casing removed and depicting the improved seal system installed on the lower casing.

With reference now to FIGS. 3, 4, 6 and 7 the improved seal system of the present invention provides an improved axially split centrifugal pump 100. The improved seal system of the present invention includes flanges 118a, 118b, side cover 112c and an elastomeric cord 130. As depicted in FIGS. 6A, 6B each flange 118a, 118b carries two recessed grooves 132, 134, referred to herein as grooves. FIGS. 7A, 7B depict the more common embodiment wherein only flange 118a carries grooves 132, 134. Additionally, side cover 112c will have a recess or groove 136 and typically carries a splitter or flow diverter 120. Further, side cover 112c supports bearing housing 16. As depicted in FIG. 4, bolts 121 secure bearing housing 16 to side cover 112c.

Figure 6A:
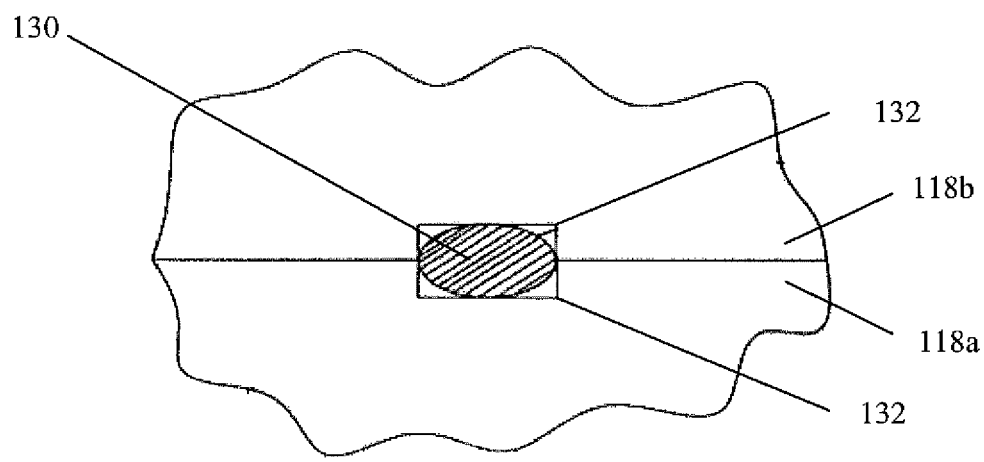
FIG. 6A depicts a side cut-away view of the casing flanges with the improved seal system compressed between the flanges prior to operation of the centrifugal pump.
Figure 6B:
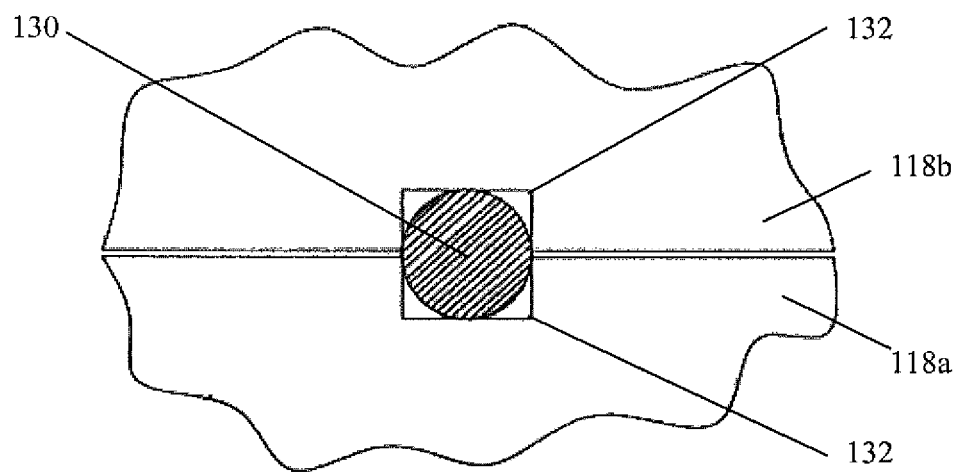
FIG. 6B depicts a side cut-away view of the casing flanges with a slight separation of the flanges while the improved seal system provides a fluid tight seal between the flanges during operation of the centrifugal pump.

FIGS. 6A, 6B, 7A and 7B depict the relationship of groove 132 and cord 130. The depicted configuration of 6A, 6B, 7A and 7B also represents the relationship of cord 130 within grooves 134 and 136. As depicted in FIGS. 6A and 6B, both flanges 118a, 118b have grooves 132. Although not shown in FIGS. 6A and 6B, in this embodiment, both lower and upper casing halves 112a and 112b also carry groove 134. With regard to the embodiment depicted in FIGS. 7A and 7B, only flange 118a on lower casing half 112a has recessed grooves 132, 134. The configuration of FIGS. 7A and 7B reduces machining costs and will typically provide a pump capable of producing a higher head value than the configuration of FIGS. 6A and 6B.

As depicted in FIGS. 4 and 11A-C, to complete the seal between lower and upper casing halves 112a and 112b, side cover 112c is positioned between casing halves 112a and 112b. Side cover 112c has a surface 114 carrying groove 136 with cord 130 positioned within groove 136. When pump 100 is assembled, surface 114 mates to corresponding surface 115 of lower casing half 112a and surface 116 of upper casing half 112b. Additionally, side cover 112c has a flange 117 with a plurality of bolt holes 119. As depicted in FIG. 4, bolts 121 passing through bolt holes 119 secure side cover 112c to lower and upper casing halves 112a, 112b by engaging threaded holes (not shown) within lower and upper casing halves 112a, 112b.

Figure 5A:
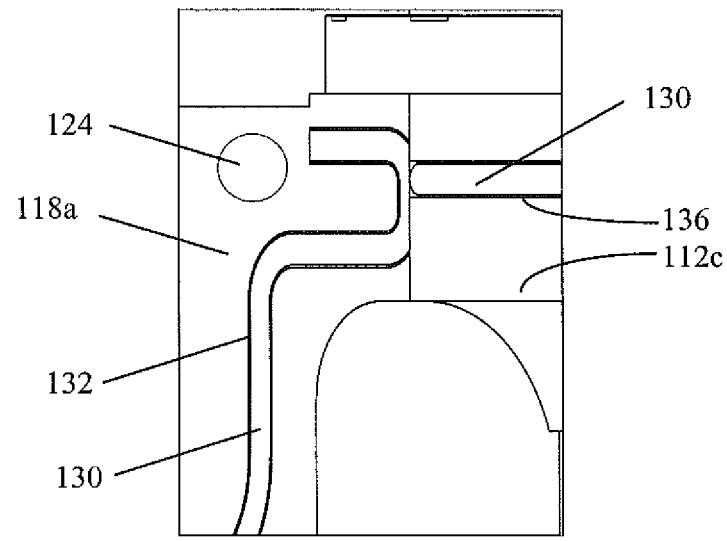
FIGS. 5A and 5B depict alternative configurations for the junction of the lower casing elastomeric cord with the elastomeric cord carried by the side cover.
Figure 5B:
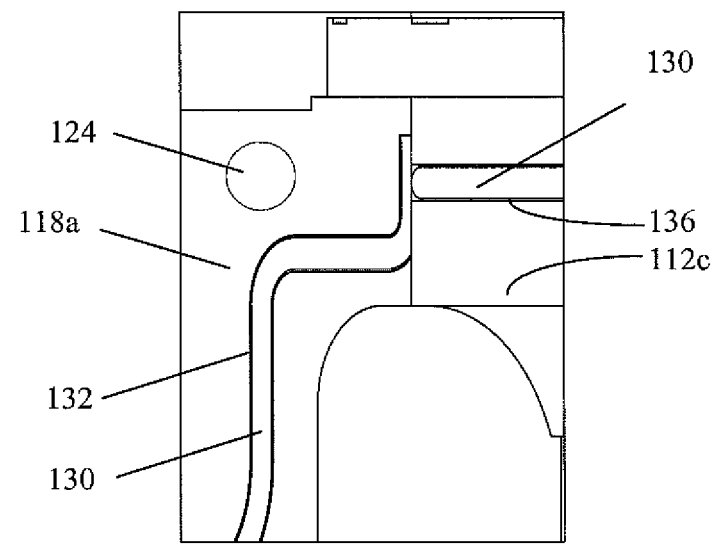

In addition to the seal provided by cords 130 in grooves 132 and 134, cord 130 positioned within groove 136 of side cover 112c must seal against both lower and upper casing halves 112a, 112b around the entire circumference of side cover 112c. Additionally, cord 130 position within groove 136 must provide a seal at the contact point of side cover 112c with flanges 118a and 118b. To provide this seal, cord 130 within groove 136 must be in contact with cord 130 located within groove 132. While various contact points between cord 130 of groove 136 and cord 130 of groove 132 will provide adequate seals, FIGS. 5a and 5b depict configurations which provide a sealing system capable of generating the highest head values. For the purposes of this disclosure, these contact configurations are identified as a "U-joint" (FIG. 5A) and "L-joint" (FIG. 5B). Thus, maximum sealing capability results when cord 130 within groove 132 passes beyond the contact point with cord 130 within groove 136.

In general, the total depth provided by each recess or groove 132, 134, 136 is about 3 mm to about 10 mm. Thus, regardless of whether each flange 118a, 118b carries grooves 132, 134 or only one flange carries grooves 132, 134, each groove has a total groove depth of about 3 mm to about 10 mm. Grooves 132, 134 may be formed by any conventional method known to those skilled in the art. As depicted in FIGS. 3 and 4, directional transitions are typically curved to preclude binding of cord 130. Further, the upper edge of grooves 132, 134 will generally have a slight radius sufficient to eliminate sharp edges. With regard to side cover 112c and mating surfaces 115 and 116 of lower and upper casing halve 112a and 112b, mating surfaces 115 and 116 may carry a corresponding groove; however, the generally preferred configuration of pump 100 will utilize only groove 136 on surface 114 of side cover 112c. This configuration simplifies machining and assembling of pump 100. Thus, groove 136 will typically have a depth of about 3 mm to about 10 mm.

As depicted in FIG. 3, cords 130 within grooves 132, 134 and 136 within pump 100 provide a seal suitable to prevent: (a) internal recirculation of fluid from the high pressure zone 122 to the low pressure zone 123 of pump 100 (groove 134), and (b) leakage to the exterior of pump 100 (groove 132). As depicted groove 132 generally passes between bolt holes 124 in the lower and upper half casings 112a, 112b and fluid passage areas 122 and 123 thereby avoiding potential leakage past bolts 121 within holes 124. Thus, groove 132 precludes leakage of fluid from pump 100 to the external environment. Groove 134 corresponds to the impeller fluid passage 122 and isolates high pressure zones 122 from lower pressure zone 123.

Figure 9:
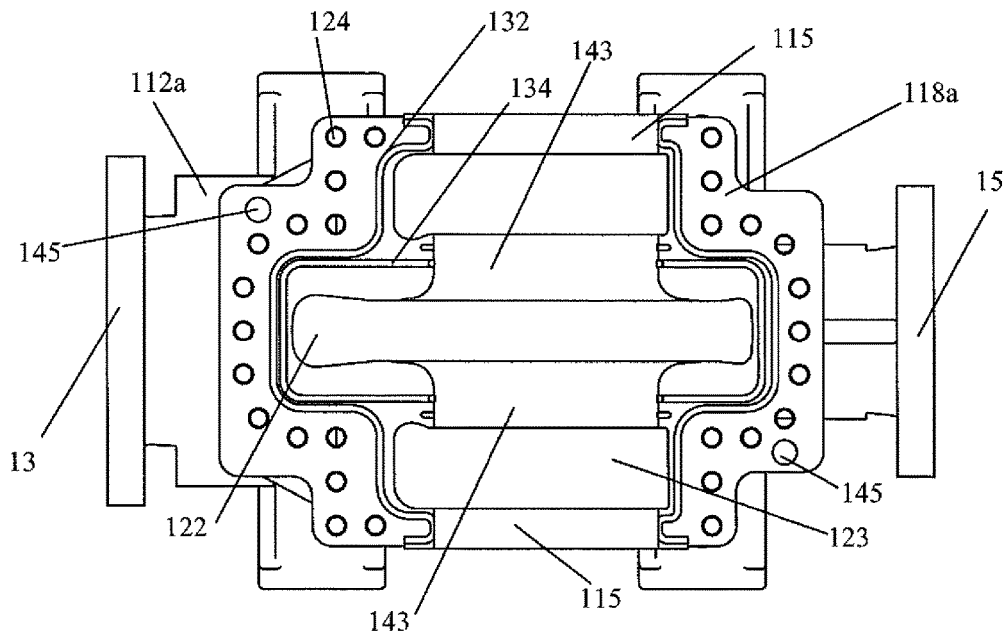
FIG. 9 is top view of the lower casing of a centrifugal pump incorporating the improved sealing system of the present invention.
Figure 10:
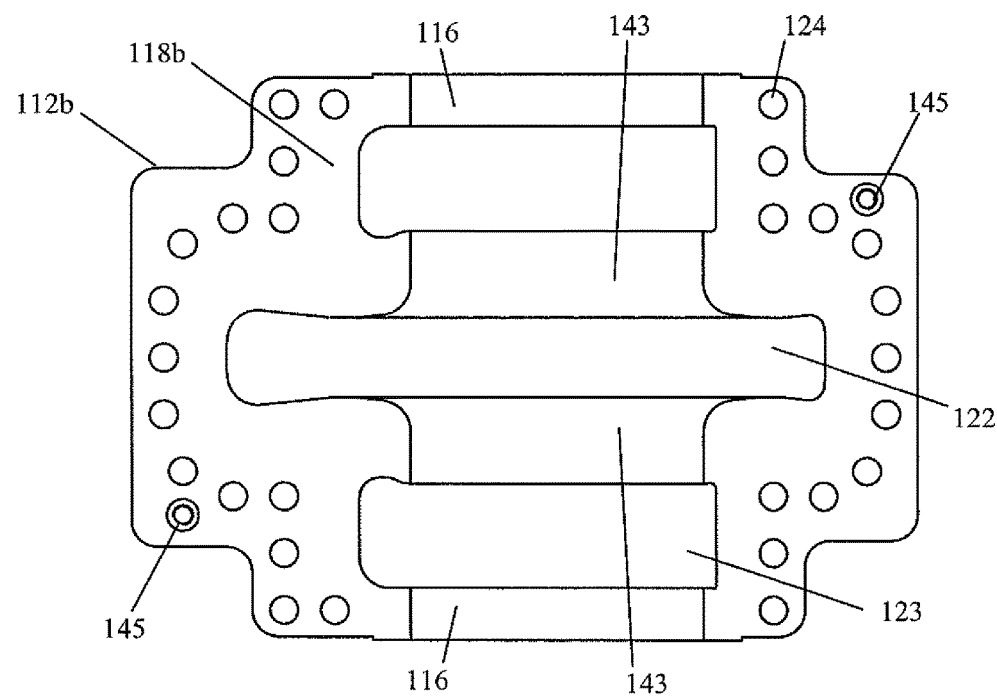
FIG. 10 is a bottom view of the upper easing of a centrifugal pump incorporating the improved sealing system of the present invention.
Figure 11A:
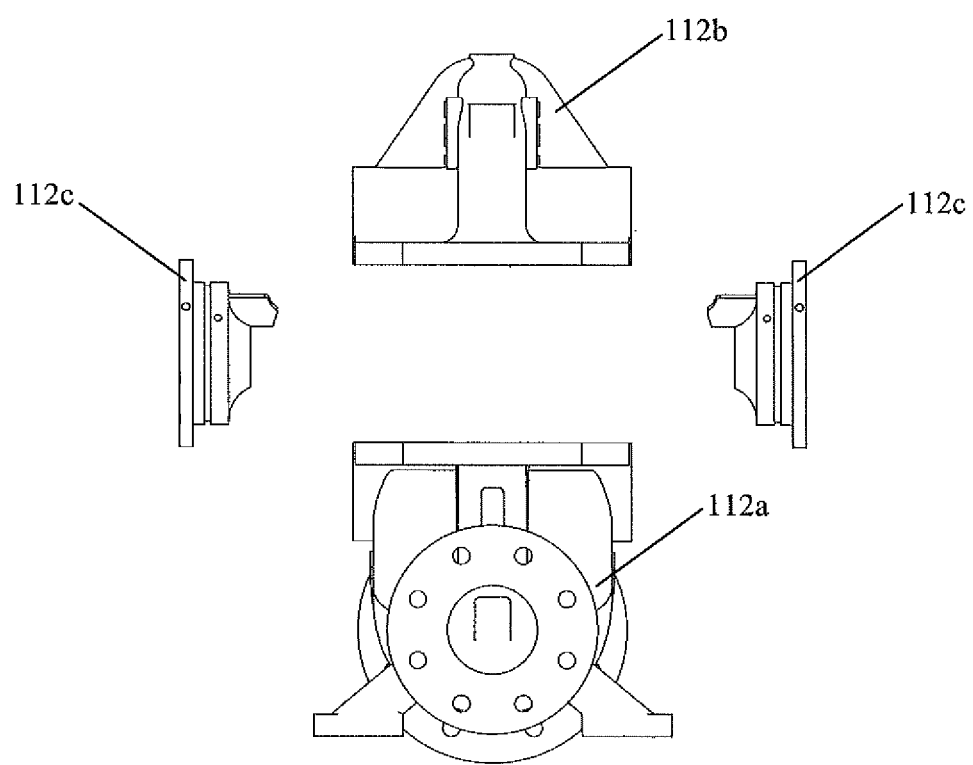
FIG. 11A provides an exploded side view depicting the upper and lower casing halves, and the side cover.
Figure 11B:
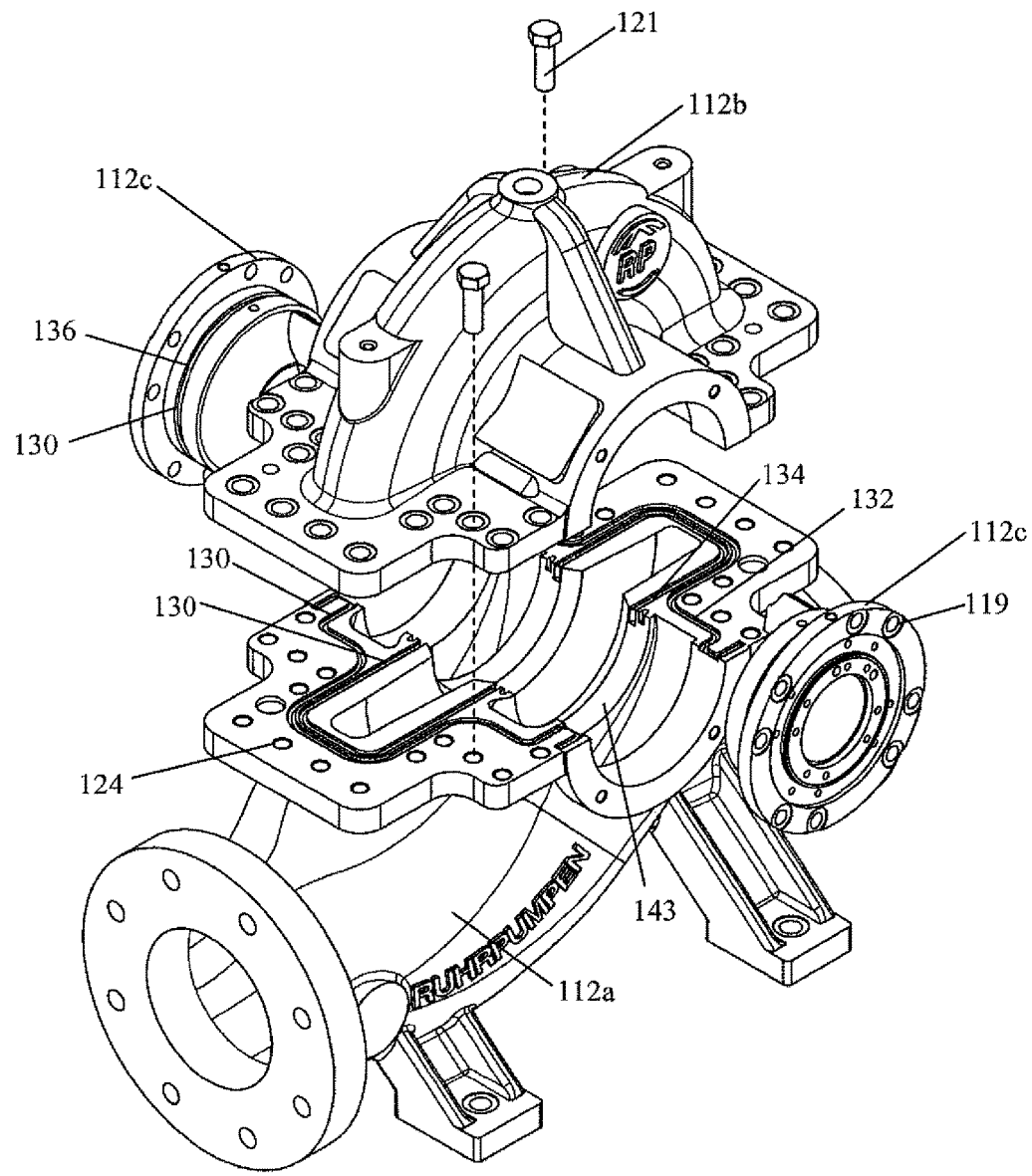
FIG. 11B provides a side perspective view in exploded format depicting the upper and lower casing halves, and the side covers.
Figure 11C:
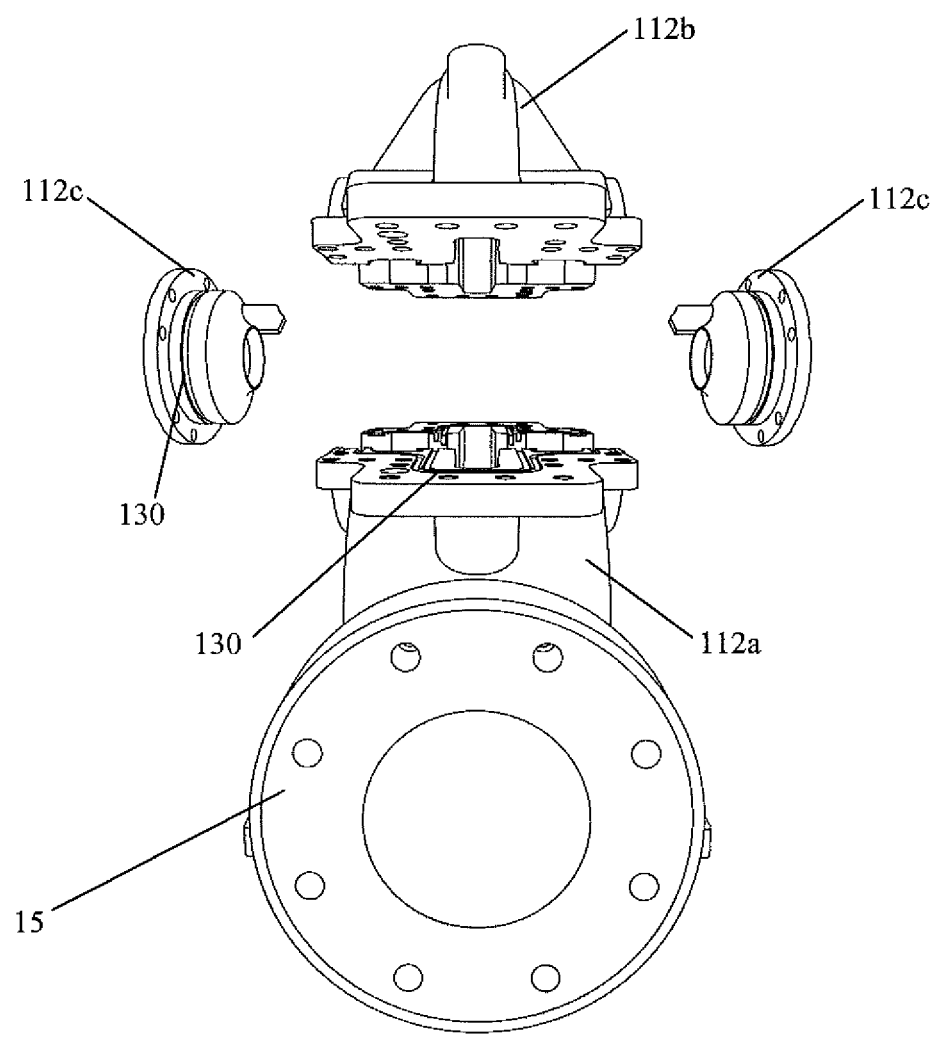
FIG. 11C provides an explode view taken from the discharge side of the pump.

Thus, with lower and upper casing halves 112a, 112b and side cover 112c assembled, grooves 132, 134, 136 and elastomeric cord 130 provide the improved seal system of the present invention. As depicted in FIGS. 4, 9-10, generally flange 118a will carrying grooves 132, 134 while side cover 112c carries groove 136, with cords 130 positioned within each groove. Thus, the improved sealing system ensures sealing of lower half casing 112a, upper half casing 112b, and side cover 112c while operating at high pressure and producing greater head values than previously obtainable with prior art sealing systems. As previously discussed, the present invention also includes an embodiment wherein both flanges 118a and 118b carrying corresponding grooves 132, 134.

The material used for elastomeric cord 130 will be determined by the intended application of pump 100, i.e. fluids and operating temperatures. For example, when pump 100 is used to transport either fresh or waste water, elastomeric cord 130 will typically be Neoprene. In general, a non-limiting list of elastomeric cord material includes, neoprene, i.e. polychloroprene, perfluoroelastomers (also known as fluorocarbon rubber) such as Kalrez® and Viton® sold by the E.I. dupont de Nemours Co, and Ethylene propylene diene monomer rubber (EPDM), Isobutylene isoprene rubber or butyl rubber (IIR), Styrene butadiene rubber (SBR), Isoprene rubber (IR), Ethylene vinyl acetate copolymer rubber (EVM), Silicone rubber (VMQ), Chlorosulfonated polyethylene rubber (CSM), Chlorinated polyethylene rubber (CPE), Tetrafluoroethylene propylene rubber (FEPM), Fluorosilicone rubber (FVMQ), Polyacrylate Acrylic rubber (ACM), Hydrogenated nitrile butadiene rubber (HNBR), Epichlorohydrin copolymer rubber (ECO), Nitrile rubber (NBR).

Typically, elastomeric cord 130 has a diameter of about 5 mm to about 12 mm. Further, elastomeric cord 130 should have the ability to be compressed at least 15%. More preferably, elastomeric cord 130 should be capable of being compressed at least 25%. In general, elastomeric cord 130 having compressibility between about 15% and about 55% will be suitable for use in the present invention. As used herein, the percent compression refers to the reduction in the vertical diameter of cord 130 when lower and upper casing halves 112a, 112b are fully assembled to one another and prior to operation of the pump. Typically, with casing halves 112a, 112b fully assembled and prior to pump operation, cord 130 will be compressed between 20% and 50% between groove 132, 134, 136 and the opposing mating surface. When compressed, cord 130 will expand laterally within groove 132, 134, 136. Cord 130 may have any cross-sectional configuration, including, but not limited to, round, rectangular or square.

Figure 7A:
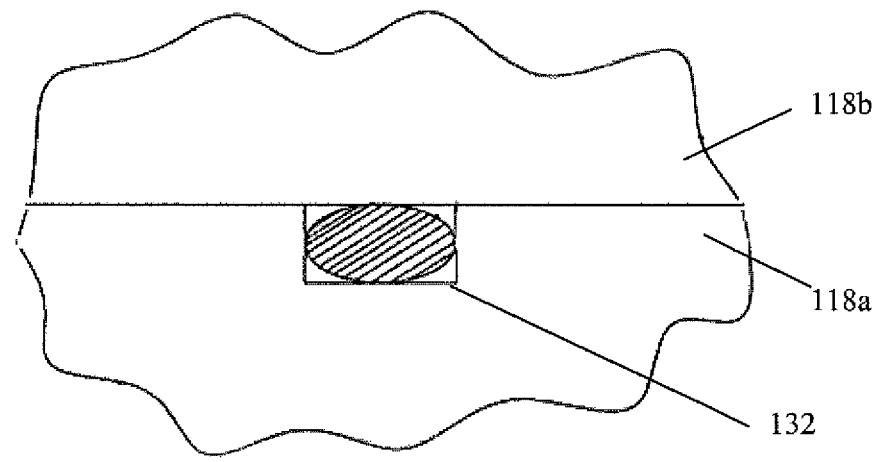
FIGS. 7A and 7B depict a side cut-away view of the casing flanges wherein the improved seal system utilizes a recess or groove located only in the lower casing half.

Thus, when in the assembled configuration, cord 130 is compressed vertically within grooves 132, 134, 136 prior to operation of pump 100 as depicted in FIGS. 6A and 7A. Stated another way, the vertical height of cord 130 when positioned within grooves 132, 134 and 136 should exceed the total recess depth of grooves 132, 134, 136 by at least 15%, more preferably by at least 25%. However, cord 130 may exceed the total groove depth by about 35% to about 55%. Thus, compression of cord 130 permits direct contact between casing halves 112a and 112b and between casing halves 112a, 112b and side cover 112c prior to operation at high temperatures.

The improved seal system provides several manufacturing and operational advantages over the prior art gasket material. As noted above, prior art pumps typically require lower flanges 118a having thicknesses between about 2 inches (or 50 mm) to about 6 inches (or 150 mm) and upper flanges 118b having thicknesses between about 2 inches (or 50 mm) to about 6 inches (or 150 mm). Use of the improved seal system disclosed herein allows the pump manufacturing to reduce flange thickness by about 10% to about 50% thereby relying upon flanges of about 1 inch to about 3 inches.

For example, a prior art pump generating a head of about 300 meters to about 320 meters typically required a lower flange thickness of about 2 inches to about 2.5 inches and an upper flange thickness of about 2 inches to about 2.5 inches with a gasket positioned between the flanges. When using the improved seal system of the present invention, a pump producing the same head requires lower flange 118a thickness of about 1 inch to about 1.5 inch and an upper flange 118b thickness of about 1 inch to about 1.5 inch. Thus, the present invention reduces manufacturing costs by reducing material requirements. Typical weight savings in the final pump range from about 15% to about 35%.

As a second example, a prior art pump capable of producing head values between about 100 meters and about 150 meters typically had a housing weight, i.e. total weight of lower and upper casing halves 112a, 112b, between about 350 kg and about 400 kg. In contrast, a pump utilizing the seal system of the present invention and capable of producing head values between about 100 meters and about 150 meters will typically have a total casing weight between about 250 kg and about 300 kg.

Figure 7B:
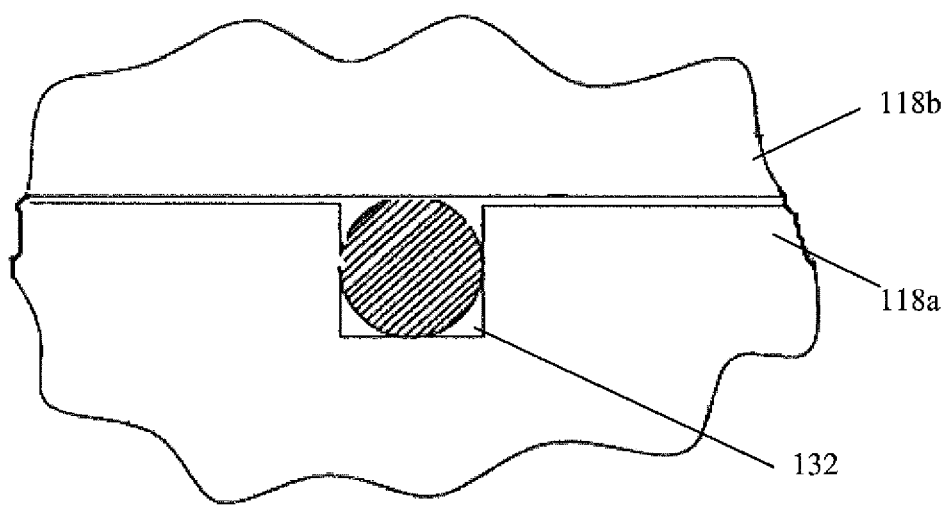
Figure 8A:
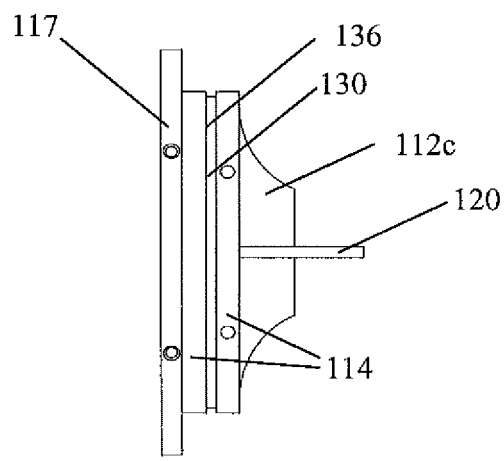
Figure 8B:
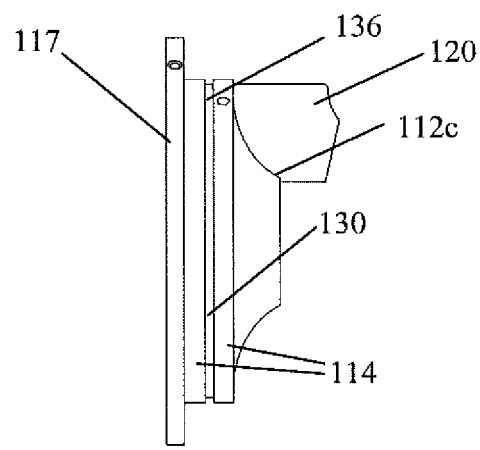

As depicted by FIGS. 6B and 7B, expansion of elastomeric cord 130 compensates for the slight separation in casing halves 112a, 112b or deformation of flanges 118a, 118b during operation of pump 100 under high pressure. The expansion of cord 130 fills the resulting gap maintaining a fluid seal between casing halves 112a, 112b and side cover 112c. Thus, as discussed above, elastomeric cord 130 will be chosen for the intended operating conditions of pump 100 as elastomeric cord 130 may be exposed to the pumped fluid. Thus, use of the improved seal system permits operation of pump 100 at higher pressures, higher temperatures and allows for operation with greater flange deformations. The ability of pump 100 to operate at high temperatures is further enhanced by selecting cord materials, such as perfluoroelastomers (e.g. Kalrez® and Viton®), among others. Further, the degree of cord compressibility enhances the ability of pump 100 to compensate for flange deformations when operating at high internal pressures. As discussed above, during deformation, expansion of compressed cord 130 fills the resulting space created between lower and upper casing halves 112a, 112b thereby maintaining the fluid tight seal necessary for operation of pump 100. For example, if a 9 mm cord 130 is compressed 30% to produce a compressed diameter of 6 mm, then deformation or separation of casing halves 112a, 112b up to 2 mm can be handled by the improved sealing system. Additionally, if a 12 mm cord is compressed 55% within a groove of 5.4 mm, then improved the sealing system can accommodate a separation ranging from metal to metal contact up to a flange separation of 5.1 mm, i.e. a cord expansion up to 10.5 mm of the original 12 mm thickness.

Alternatively, use of the improved seal system permits operation of pump 100 at higher head and flow rates. For examples, a conventional centrifugal pump 10 having combined upper and lower flange thickness of about 3 inches produces head values between about 50 meters and about 70 meters when operating at 1800 rpm and using a conventional sealing configuration such as gasket material 19. Replacing gasket material 19 with the improved seal system of the present invention will allow pump 100, having the same design configuration, to produce head values between about 150 meters and about 300 meters when operating at 3600 rpm. Note: to permit operation of the prior art pump at 3600 rpm with the gasket material, the flange thickness of the prior art pump must be increased. Thus, the current invention permits operation at higher rpm and head values without increasing flange thickness.

A further benefit provided by the current invention relates to reduce manufacturing costs, reduced assembly time and simplified service of pumps incorporating the current invention. Replacement of conventional gasket material with the improved seal system reduces machining costs of the lower casing 112a and upper half casing 112b. Further, assembly time is reduced by eliminating the need to cut and position gasket material on flange 118a.

Additionally, as discussed above, elimination of gasket material 19 from improved pump 100 permits a more precise machining during machining of side cover seating surfaces 115, 116 and impeller seats 143. In the manufacture of improved pump 100, lower and upper casing halves may be bolted to one another and curved surfaces, i.e. side cover seating surfaces 115, 116 and impeller seats 143 machined to provide the necessary circular openings. As discussed above, use of a gasket between casing halves in prior art pumps precluded interchangeability of lower and upper casing halves. However, the compressible nature of cord 130 permits direct metal to metal contact between casing halves 112a and 112b at flanges 118a, 118b. Thus, each casing half 112a, 112b will have a true circular machining to all curved surfaces. Accordingly, during the machining step, the improved seal system permits the use of a master upper half and a master lower half allowing production casing halves 112a, 112b to be machined separately from each other. In this method, the production lower half casing 112a would be bolted to the master upper half casing (not shown) and machined. Likewise, the production upper half casing 112b would be bolted to the master lower half casing (not shown) and machined. Thus, pump longevity can be increased by permitting substitution of a casing half on an existing pump having the improved seal system.

Finally, to aid in the mating of upper and lower casing halves 112a, 112b, holes 145 in upper and lower casing halves 112a, 112b may be fitted with an alignment bushing (not shown). Positioning of upper casing half 112b over the alignment bushing ensures accurate mating of bolt holes 124 on upper and lower flanges 118a, 118b. Additionally, this feature substantially precludes pinching of cord 130 between flanges 118a, 118b.

The present invention also reduces maintenance costs by eliminating the need to remove gasket material from flanges 118a, 118b during servicing of the internal components. Finally, cord 130 may be used multiple times without detriment to pump operation thereby reducing maintenance costs.

Other embodiments of the present invention will be apparent to one skilled in the art. As such, the foregoing description merely enables and describes non-limiting aspects of the present invention. Accordingly, the following claims define the true scope of the present invention.

We claim:
1. An axially split, centrifugal pump comprising:
    a lower casing half, carrying a flange having a mating surface;
    an upper casing half, carrying a flange having a mating surface, said flange having at least a first groove;
    a first elastomeric cord positioned within said first groove, said first elastomeric cord having a vertical height greater than the depth of said first groove;
    a side cover having a mating surface with at least a portion of the mating surface in contact with said upper casing half and at least a portion of said mating surface in contact with said lower casing half, said mating surface of said side cover further carrying a side cover groove with a second elastomeric cord positioned in said side cover groove, said second elastomeric cord having a vertical height greater than the depth of said side cover groove, wherein said first elastomeric cord positioned within said first groove contacts said second elastomeric cord positioned within said side cover groove;
    said upper and lower casing halves secured to one another such that said mating surfaces of said upper and lower casing halves have direct contact when assembled.
2. An axially split, centrifugal pump comprising:
    a lower casing half, carrying a flange having a mating surface, said flange having at least a first groove;

a first elastomeric cord positioned within said first groove, said first elastomeric cord having a vertical height greater than the depth of said first groove;

an upper casing half, carrying a flange having a mating surface;

a side cover having a mating surface with at least a portion of the mating surface in contact with said upper casing half and at least a portion of said mating surface in contact with said lower casing half, said mating surface of said side cover further carrying a second groove with a second elastomeric cord positioned in said second groove, said second elastomeric cord having a vertical height greater than the depth of said second groove, wherein said first elastomeric cord positioned within said first groove contacts said second elastomeric cord positioned within said second groove;

said upper and lower casing halves secured to one another such that said mating surfaces of said upper and lower casing halves have direct contact when assembled.

3. An axially split, centrifugal pump comprising:

a lower casing half, carrying a flange having a mating surface, said flange having a first groove and a second groove, said first groove isolating a high pressure zone from a low pressure zone;

a first elastomeric cord positioned within said first groove, said first elastomeric cord having a vertical height greater than the depth of said first groove and a second elastomeric cord positioned within said second groove;

an upper casing half, carrying a flange having a mating surface;

a side cover having a mating surface in contact with said upper and said lower casing halves;

said upper and lower casing halves secured to one another such that said mating surfaces of said upper and lower casing halves have direct contact when assembled.

4. An axially split, centrifugal pump comprising:

a lower casing half, carrying a flange having a mating surface, said flange having a first groove and a second groove, said first groove isolating a high pressure zone from a low pressure zone and said second groove isolating said low pressure zone from the external environment;

a first elastomeric cord positioned within said first groove, said first elastomeric cord having a vertical height greater than the depth of said first groove and a second elastomeric cord positioned within said second groove;

an upper casing half, carrying a flange having a mating surface;

a side cover having a mating surface in contact with said upper and said lower casing halves;

said upper and lower casing halves secured to one another such that said mating surfaces of said upper and lower casing halves have direct contact when assembled.

5. An axially split, centrifugal pump comprising:

a lower casing half, carrying a flange having a mating surface, said flange having a first groove and a second groove, said first groove isolating a high pressure zone from a low pressure zone and said second groove isolating said low pressure zone from the external environment;

a first elastomeric cord positioned within said first groove, said first elastomeric cord having a vertical height greater than the depth of said first groove and a second elastomeric cord positioned within said second groove, said second elastomeric cord having a vertical height greater than the depth of said second groove;

an upper casing half, carrying a flange having a mating surface;

a side cover having a mating surface with at least a portion of the mating surface in contact with said upper casing half and at least a portion of said mating surface in contact with said lower casing half, said mating surface of said side cover further carrying a side cover groove with a side cover elastomeric cord positioned in said side cover groove, said side cover elastomeric cord having a vertical height greater than the depth of said side cover groove;

said upper and lower casing halves secured to one another such that said mating surfaces of said upper and lower casing halves have direct contact when assembled and prior to operation.

6. The axially split, centrifugal pump of claim 2, 3, 4 or 5, wherein said first groove and said first elastomeric cord and said second groove and said second elastomeric cord cooperate with the opposing mating surface to provide a fluid tight seal.

7. The axially split, centrifugal pump of claim 2, 3, 4 or 5 wherein each groove has a depth of about 3 mm to about 10 mm.

8. The axially split, centrifugal pump of claim 2, 3, 4, or 5, wherein the flange carried by said upper casing half carries at least one groove corresponding to each groove in said lower casing half.

9. The axially split, centrifugal pump of claim 8, wherein the total depth provided by corresponding grooves in said flanges carried by said upper and lower casing halves is between about 5 mm to about 8 mm when said upper and lower casing halves are assembled.

10. The axially split, centrifugal pump of claim 7, wherein at least one of the elastomeric cords exceeds total groove depth by about 15% to about 55%.

11. The axially split, centrifugal pump of claim 7, wherein at least one of the elastomeric cords exceeds total groove depth by about 15% to about 35%.

12. The axially split, centrifugal pump of claim 7, wherein at least one of the elastomeric cords exceeds total groove depth by about 15% to about 30%.

13. The axially split, centrifugal pump of claim 7, wherein at least one of the elastomeric cords exceeds total groove depth by about 15% to about 25%.

14. The axially split, centrifugal pump of claim 7, wherein at least one of the elastomeric cords has a vertical height of about 5 mm to about 12 mm.

15. The axially split, centrifugal pump of claim 7, wherein at least one of the elastomeric cords may be compressed between about 15% to about 55% of its total height when said upper casing half is assembled to said lower casing half.

16. The axially split, centrifugal pump of claim 7, wherein at least one of the elastomeric cords may be compressed between about 20% to about 50% of its total height when said upper casing half is assembled to said lower casing half.

17. The axially split, centrifugal pump of claim 7, wherein at least one of the elastomeric cords maintains a water tight seal when said upper casing half is assembled to said lower casing half and said assembled centrifugal pump casing is pressurized to a degree sufficient to produce up to about 5.1 mm separation at least at one point between mating surfaces of said flanges.

18. The axially split, centrifugal pump of claim 6, wherein at least one of said first elastomeric cord and said second elastomeric cord maintains a water tight seal when said upper casing half is assembled to said lower casing half and said assembled casing is pressurized to a degree sufficient to produce from up to about 5.1 mm separation at least at one point between mating surfaces of said flanges.

19. The axially split, centrifugal pump of claim 7, wherein at least one of the elastomeric cords comprises an elastomer selected from the group consisting of: polychloroprene, perfluoroelastomers, ethylene propylene diene monomer rubber, isobutylene isoprene rubber or butyl rubber, styrene butadiene rubber, isoprene rubber, ethylene vinyl acetate copolymer rubber, silicone rubber, chlorosulfonated polyethylene rubber, chlorinated polyethylene rubber, tetrafluoroethylene propylene rubber, fluorosilicone rubber, polyacrylate acrylic rubber, hydrogenated nitrile butadiene rubber, epichlorohydrin.

20. The axially split, centrifugal pump of claims 1, 2, 3, 4 or 5, wherein said flange carried by said lower casing half has a thickness between about one inch to about 1.5 inch and said flange carried by said upper casing half has a thickness between about one inch to about 1.5 inch and wherein said pump generates a head of at least 320 meters when pumping water.

21. The axially split, centrifugal pump of claims 1, 2, 3, 4, or 5, wherein said flange carried by said lower casing half has a thickness between about one inch to about three inches and said flange carried by said upper casing half has a thickness between about one inch to about three inches.

22. The axially split, centrifugal pump of claim 21, wherein said centrifugal pump generates head values between about 300 meters to about 350 meters.

23. The axially split, centrifugal pump of claims 1, 2, 3, 4, or 5, wherein said flange carried by said lower casing half has a thickness between about one inch to about 1.5 inches and said flange carried by said upper casing half has a thickness between about one inch to about 1.5 inches and said centrifugal pump generates head values between about 300 meters to about 320 meters.

24. A method of manufacturing axially split centrifugal pumps comprising the steps of:
    forming a lower casing half having a flange, said flange having a mating surface wherein said mating surface carries at least one groove;
    forming an upper casing half having a flange with a mating surface;
    providing a side cover, said side cover having a mating surface carrying a groove;
    positioning a first elastomeric cord in said at least one groove on the mating surface of said lower casing half flange and a second elastomeric cord in said groove carried by said side cover;
    assembling said upper casing half to said lower casing half such that each mating surface directly contacts the opposing mating surface and such that at least a portion of said side cover mating surface contacts said upper casing half and at least a portion of said side cover mating surface contacts said lower casing half wherein said first elastomeric cord positioned within said at least one groove in said lower casing half contacts said second elastomeric cord positioned within said groove carried by said mating surface of said side cover;
    machining impeller seats into said upper and lower casing halves.

25. A method of manufacturing axially split centrifugal pumps comprising the steps of:
    forming a plurality of lower casing halves, each lower casing half having a flange, said flange having a mating surface wherein said mating surface carries at least one groove;
    providing a master upper casing half having a flange with a mating surface;
    positioning an elastomeric cord in at least one groove on the mating surface of said lower casing half flange;
    assembling each lower casing half to said master upper casing half wherein each mating surface directly contacts the opposing mating surface;
    machining impeller seats into each lower casing half;
    forming a plurality of upper casing halves, each upper casing half having a flange with a mating surface;
    providing a master lower casing half having a flange, said master lower casing half flange having a mating surface carrying at least one groove;
    positioning an elastomeric cord in at least one groove on said master lower casing half flange;
    assembling each upper casing half to said master lower casing half wherein each mating surface directly contacts the opposing mating surface; and,
    machining impeller seats into each upper casing half;
    assembling one of said plurality of upper casing halves to one of said plurality of lower casing halves to provide a complete casing for an axially split centrifugal pump.

26. The methods of claim 24 or 25, further comprising the step of machining impeller seats into said upper and lower casing halves.

27. The axially split, centrifugal pump of claim 2, wherein said flange of said lower casing half further comprises a second lower casing half groove and a second lower casing half elastomeric cord positioned within said second lower casing half groove.

28. The axially split, centrifugal pump of claim 27, wherein the combination of said first groove and said first elastomeric cord cooperate to isolate a high pressure zone from a low pressure zone.

29. The axially split, centrifugal pump of claim 3, wherein said mating surface of said side cover further comprises a groove with an elastomeric cord positioned within said groove, said elastomeric cord having a vertical height greater than the depth of said groove.

30. The axially split, centrifugal pump of claim 4, wherein said mating surface of said side cover further comprises a groove with an elastomeric cord positioned within said groove, said elastomeric cord having a vertical height greater than the depth of said groove.

31. The method of claim 25, further comprising the steps of:
    following the step of assembling one of said plurality of upper casing halves to one of said plurality of lower casing halves to provide a complete casing for an axially split centrifugal pump, machining side cover mating surfaces into the assembled upper and lower casing halves;
    providing a side cover, said side cover having a groove;
    placing a second elastomeric cord in said groove on said side cover; and,
    the step of assembling said upper casing half to said lower casing half and to said side cover results in said first elastomeric cord positioned within said at least one groove in said lower casing half contacting said second elastomeric cord positioned within said groove carried by said mating surface of said side cover.

32. The method of claim 25, further comprising the steps of:
    following the step of assembling one of said plurality of upper casing halves to one of said plurality of lower casing halves to provide a complete casing for an axially split centrifugal pump, machining a side cover mating surface into a first side of the assembled upper and lower casing halves and machining a side cover mating surface into a second side of the assembled upper and lower casing halves;

providing a first side cover, said first side cover having a groove and a second side cover, said second side cover having a groove;

placing a second elastomeric cord in said groove on said first side cover;

placing a third elastomeric cord in said groove on said second side cover;

assembling said first side cover to said first side of said assembled upper and lower casing halves; and, assembling said second side cover to said second side of said assembled upper and lower casing halves.

33. The axially split, centrifugal pump of claim 1, wherein said side cover is positioned between said lower casing half and said upper casing half and wherein said mating surface of said side cover is a circumferential mating surface with said side cover groove on an outer surface of said circumferential mating surface.

34. The axially split, centrifugal pump of claim 2, wherein said side cover is positioned between said lower casing half and said upper casing half and wherein said mating surface of said side cover is a circumferential mating surface with said second groove on an outer surface of said circumferential mating surface.

35. The axially split, centrifugal pump of claim 3, wherein said side cover is positioned between said lower casing half and said upper casing half and wherein said mating surface of said side cover is a circumferential mating surface with a side cover groove on an outer surface of said circumferential mating surface.

36. The axially split, centrifugal pump of claim 4, wherein said side cover is positioned between said lower casing half and said upper casing half and wherein said mating surface of said side cover is a circumferential mating surface with a side cover groove on an outer surface of said circumferential mating surface.

37. The axially split, centrifugal pump of claim 5, wherein said side cover is positioned between said lower casing half and said upper casing half and wherein said mating surface of said side cover is a circumferential mating surface with said side cover groove on an outer surface of said circumferential mating surface.

38. The axially split, centrifugal pump of claim 2, wherein said side cover is positioned between said lower casing half and said upper casing half and wherein said mating surface of said side cover is a circumferential mating surface with said second groove on an outer surface of said circumferential mating surface and wherein said first elastomeric cord positioned within said first groove contacts said second elastomeric cord positioned within said second groove.

39. The axially split, centrifugal pump of claim 3, wherein said side cover is positioned between said lower casing half and said upper casing half and wherein said mating surface of said side cover is a circumferential mating surface with a side cover groove on an outer surface of said circumferential mating surface and wherein said first elastomeric cord positioned within said first groove contacts a side cover elastomeric cord positioned within said side cover groove.

40. The axially split, centrifugal pump of claim 4, wherein said side cover is positioned between said lower casing half and said upper casing half and wherein said mating surface of said side cover is a circumferential mating surface with a side cover groove on an outer surface of said circumferential mating surface and wherein said first elastomeric cord positioned within said first groove contacts a side cover elastomeric cord positioned within said side cover groove.

41. The axially split, centrifugal pump of claim 5, wherein said side cover is positioned between said lower casing half and said upper casing half and wherein said mating surface of said side cover is a circumferential mating surface with said side cover groove on an outer surface of said circumferential mating surface and wherein said first elastomeric cord positioned within said first groove contacts said side cover elastomeric cord positioned within said side cover groove.

42. The axially split, centrifugal pump of claim 1, further comprising a bearing housing supported by said side cover.

43. The axially split, centrifugal pump of claim 2, further comprising a bearing housing supported by said side cover.

44. The axially split, centrifugal pump of claim 3, further comprising a bearing housing supported by said side cover.

45. The axially split, centrifugal pump of claim 4, further comprising a bearing housing supported by said side cover.

46. The axially split, centrifugal pump of claim 5, further comprising a bearing housing supported by said side cover.

* * * * *